(12) United States Patent
El-Azzami et al.

(10) Patent No.: US 12,537,829 B2
(45) Date of Patent: Jan. 27, 2026

(54) MANAGING DATA SECURITY USING A MANAGEMENT CONTROLLER OF A DATA PROCESSING SYSTEM

(71) Applicant: Dell Products L.P., Round Rock, TX (US)

(72) Inventors: Bassem El-Azzami, Austin, TX (US); Adolfo Sandor Montero, Pflugerville, TX (US); Abeye Teshome, Austin, TX (US); Vinodkumar Vasudev Ottar, McKinney, TX (US); Rajaravi Chandra Kollarapu, Allen, TX (US); Richard M. Tonry, Georgetown, TX (US); Luis Antonio Valencia Reyes, Waxahachie, TX (US); Mohit Arora, Frisco, TX (US)

(73) Assignee: Dell Products L.P., Round Rock, TX (US)

( * ) Notice: Subject to any disclaimer, the term of this patent is extended or adjusted under 35 U.S.C. 154(b) by 4 days.

(21) Appl. No.: 18/649,148

(22) Filed: Apr. 29, 2024

(65) Prior Publication Data

US 2025/0337765 A1 Oct. 30, 2025

(51) Int. Cl.
*H04L 9/40* (2022.01)
*G06F 16/903* (2019.01)
*H04L 41/16* (2022.01)

(52) U.S. Cl.
CPC ........ *H04L 63/1416* (2013.01); *G06F 16/903* (2019.01); *H04L 41/16* (2013.01); *H04L 63/1425* (2013.01); *H04L 63/1433* (2013.01)

(58) Field of Classification Search
CPC . H04L 63/1416; H04L 63/20; H04L 63/1425; H04L 63/1433; H04L 63/1441;
(Continued)

(56) References Cited

U.S. PATENT DOCUMENTS

| 7,969,909 B2 | 6/2011 | Oerton |
| 8,042,182 B2 | 10/2011 | Milani Comparetti et al. |

(Continued)

FOREIGN PATENT DOCUMENTS

| CN | 105530121 A | 4/2016 |
| CN | 109756797 A | 5/2019 |

(Continued)

OTHER PUBLICATIONS

Latvala et al., "Evaluation of Out-of-Brand Channels for IoT Security", SN Computer Science, pp. 1-17 (Year: 2020).

*Primary Examiner* — Kyung H Shin
(74) *Attorney, Agent, or Firm* — WOMBLE BOND DICKINSON (US) LLP

(57) ABSTRACT

Methods and systems for managing operations of a data processing system are disclosed. To manage operations of the data processing system, a management controller of the data processing system may provide user access data for the data processing system obtained from hardware resources to a security manager. The management controller may obtain a response from the security manager based on the user access data. In a first instance of the obtaining where the response indicates that the data processing system is exhibiting a level of data vulnerability that meets criteria, the management controller may obtain a security policy comprising an action set for updating the operation of the data processing system. The management controller may perform the action set to update an existing operating state of the data processing system to a new operating state to reduce the level of data vulnerability exhibited by the data processing system.

20 Claims, 7 Drawing Sheets

(58) Field of Classification Search
CPC ............ H04L 41/0213; H04L 41/0853; H04L 41/142; H04L 61/103; H04L 41/12; H04L 67/303; H04L 45/745; H04L 45/04; H04L 41/0672; H04L 63/08; H04L 41/0893; H04L 41/082; H04L 63/0272; G06F 16/903

See application file for complete search history.

(56) References Cited

U.S. PATENT DOCUMENTS

| | | | |
|---|---|---|---|
| 8,477,647 | B2 | 7/2013 | Tamura |
| 8,533,345 | B2 | 9/2013 | Fedotenko |
| 8,538,023 | B2 | 9/2013 | Yao |
| 8,615,785 | B2 | 12/2013 | Elrod et al. |
| 8,924,620 | B2 | 12/2014 | Harriman et al. |
| 9,215,244 | B2 | 12/2015 | Ayyagari et al. |
| 9,319,967 | B2 | 4/2016 | Jonker |
| 9,413,783 | B1 | 8/2016 | Keogh |
| 9,734,169 | B2 | 8/2017 | Redlich et al. |
| 9,980,213 | B2 | 5/2018 | Lynch |
| 10,079,842 | B1 | 9/2018 | Brandwine |
| 10,079,880 | B2 | 9/2018 | Murphy |
| 10,176,308 | B2 | 1/2019 | Mintz et al. |
| 10,298,670 | B2 | 5/2019 | Ben-Shael et al. |
| 10,341,939 | B2 | 7/2019 | Peng |
| 10,362,608 | B2 | 7/2019 | Gorajala Chandra |
| 10,671,765 | B2 | 6/2020 | Swierk et al. |
| 10,972,508 | B1 | 4/2021 | Dods |
| 11,036,902 | B2 | 6/2021 | Nicholas |
| 11,102,122 | B2 | 8/2021 | Seed et al. |
| 11,134,380 | B2 | 9/2021 | Fox et al. |
| 11,399,283 | B2 | 7/2022 | Anantha |
| 11,487,274 | B2 | 11/2022 | Valder et al. |
| 11,792,267 | B2 | 10/2023 | Kreiner et al. |
| 12,034,765 | B1 | 7/2024 | Barkan |
| 12,302,236 | B2 | 5/2025 | Grayson |
| 2002/0199120 | A1 | 12/2002 | Schmidt |
| 2004/0049699 | A1 | 3/2004 | Griffith |
| 2009/0106836 | A1 | 4/2009 | Toshima |
| 2009/0197571 | A1 | 8/2009 | Kitajima |
| 2010/0083381 | A1 | 4/2010 | Khosravi |
| 2010/0169949 | A1 | 7/2010 | Rothman |
| 2011/0087387 | A1 | 4/2011 | Safa-Bakhsh et al. |
| 2011/0119765 | A1 | 5/2011 | Hering |
| 2011/0209216 | A1 | 8/2011 | Zohar |
| 2013/0152161 | A1 | 6/2013 | Onno |
| 2014/0157405 | A1 | 6/2014 | Joll |
| 2014/0366105 | A1 | 12/2014 | Bradley |
| 2016/0036839 | A1 | 2/2016 | Shimizu |
| 2016/0098561 | A1 | 4/2016 | Keller |
| 2016/0100315 | A1 | 4/2016 | Schenkel |
| 2016/0197946 | A1 | 7/2016 | Szekely |
| 2016/0345171 | A1 | 11/2016 | Kulkarni |
| 2016/0378103 | A1 | 12/2016 | Malinowski |
| 2017/0063932 | A1 | 3/2017 | Hubbard |
| 2017/0244753 | A1 | 8/2017 | Hu |
| 2018/0039946 | A1 | 2/2018 | Bolte et al. |
| 2018/0082066 | A1 | 3/2018 | Munjal |
| 2018/0124078 | A1 | 5/2018 | Hajmasan |
| 2018/0145915 | A1 | 5/2018 | Caputo, II |
| 2018/0176215 | A1 | 6/2018 | Perotti |
| 2019/0294782 | A1 | 9/2019 | Cudak |
| 2020/0092251 | A1* | 3/2020 | Peterson ............... G06F 16/903 |
| 2020/0112555 | A1 | 4/2020 | Brown |
| 2020/0244691 | A1 | 7/2020 | Veeramany |
| 2020/0366754 | A1 | 11/2020 | Wang |
| 2021/0034048 | A1 | 2/2021 | Hajizadeh |
| 2021/0073211 | A1 | 3/2021 | Wright, Sr. |
| 2021/0211450 | A1* | 7/2021 | Aleidan ............. H04L 63/1416 |
| 2021/0258808 | A1 | 8/2021 | Mahimkar |
| 2021/0382635 | A1 | 12/2021 | Ma |
| 2022/0038659 | A1 | 2/2022 | Michel |
| 2022/0300960 | A1 | 9/2022 | Gutzeit |
| 2023/0027152 | A1* | 1/2023 | Doshi ................ H04L 41/0672 |
| 2023/0412619 | A1 | 12/2023 | Tshouva |
| 2024/0069808 | A1 | 2/2024 | Bukhari |
| 2024/0195837 | A1 | 6/2024 | Duplys |
| 2024/0406145 | A1 | 12/2024 | Crabtree |
| 2025/0138839 | A1 | 5/2025 | Teshome |
| 2025/0138945 | A1 | 5/2025 | Teshome |
| 2025/0139298 | A1 | 5/2025 | Ottar |
| 2025/0141814 | A1 | 5/2025 | Montero |
| 2025/0141880 | A1 | 5/2025 | Teshome |
| 2025/0142444 | A1 | 5/2025 | Arora |
| 2025/0245059 | A1 | 7/2025 | Kollarapu |
| 2025/0245353 | A1 | 7/2025 | Montero |
| 2025/0247670 | A1 | 7/2025 | Montero |
| 2025/0247703 | A1 | 7/2025 | El-Azzami |

FOREIGN PATENT DOCUMENTS

| | | |
|---|---|---|
| CN | 113221197 A | 8/2021 |
| CN | 117439758 A | 1/2024 |
| EP | 4535743 A1 | 4/2025 |

* cited by examiner

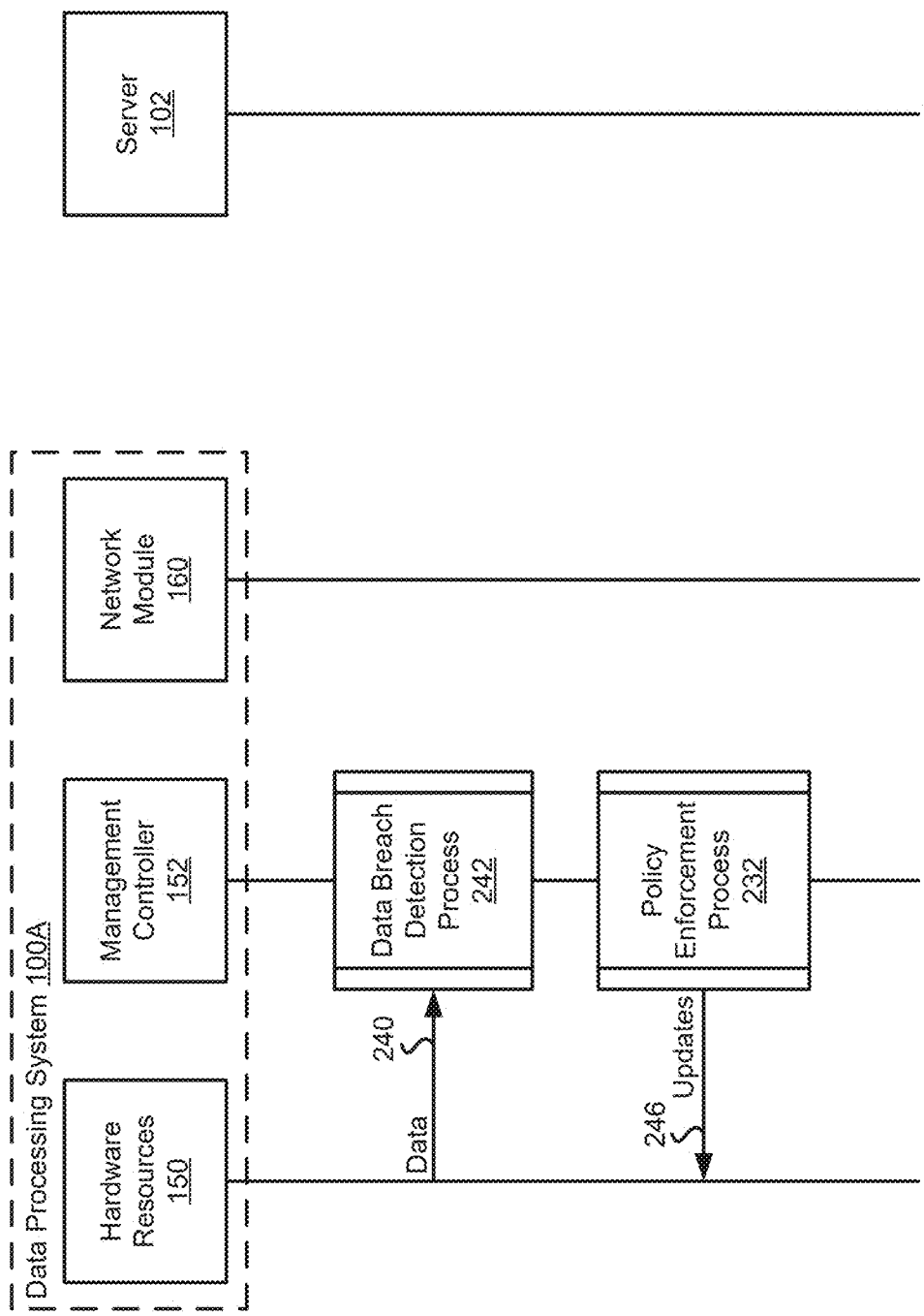

MANAGING DATA SECURITY USING A MANAGEMENT CONTROLLER OF A DATA PROCESSING SYSTEM

FIELD

Embodiments disclosed herein relate generally to managing a data processing system. More particularly, embodiments disclosed herein relate to systems and methods for managing data security using a management controller of a data processing system.

BACKGROUND

Computing devices may provide computer-implemented services. The computer-implemented services may be used by users of the computing devices and/or devices operably connected to the computing devices. The computer-implemented services may be performed with hardware components such as processors, memory modules, storage devices, and communication devices. The operation of these components may impact the performance of the computer-implemented services.

BRIEF DESCRIPTION OF THE DRAWINGS

Embodiments disclosed herein are illustrated by way of example and not limitation in the figures of the accompanying drawings in which like references indicate similar elements.

FIGS. 2A-2C show interaction diagrams in accordance with an embodiment.

DETAILED DESCRIPTION

Figure 1A:
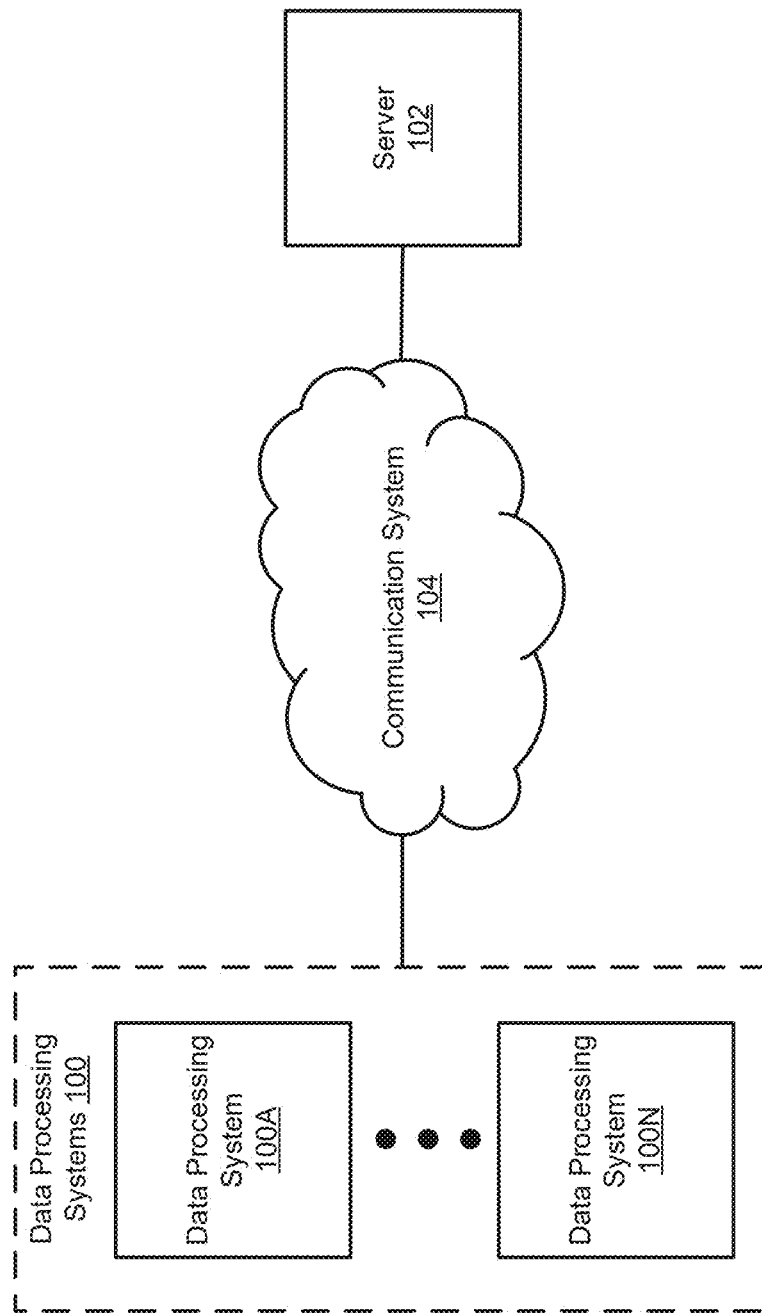
FIG. 1A shows a block diagram illustrating a system in accordance with an embodiment.

Various embodiments will be described with reference to details discussed below, and the accompanying drawings will illustrate the various embodiments. The following description and drawings are illustrative and are not to be construed as limiting. Numerous specific details are described to provide a thorough understanding of various embodiments. However, in certain instances, well-known or conventional details are not described in order to provide a concise discussion of embodiments disclosed herein.

Reference in the specification to "one embodiment" or "an embodiment" means that a particular feature, structure, or characteristic described in conjunction with the embodiment can be included in at least one embodiment. The appearances of the phrases "in one embodiment" and "an embodiment" in various places in the specification do not necessarily all refer to the same embodiment.

References to an "operable connection" or "operably connected" means that a particular device is able to communicate with one or more other devices. The devices themselves may be directly connected to one another or may be indirectly connected to one another through any number of intermediary devices, such as in a network topology.

In general, embodiments disclosed herein relate to methods and systems for managing data security of a data processing system. The data processing system may include out-of-band components such as a management controller, which may collect, analyze, and transmit data (e.g., to a remote device) without traversing in-band components of the data processing system.

To manage data security of the data processing system, the management controller may obtain user access data for authorized users of the data processing system from hardware resources of the data processing system over a duration of time. The management controller may provide the user access data to a server, which may aggregate and process the user access data to be used as a training dataset for an inference model.

The inference model may be trained using the user access data for authorized users to identify historic data access patterns. A security manager may be configured to use the trained inference model to generate predictions regarding a level of data vulnerability of the data processing system based on user access data (e.g., by comparing the user access data to the historic data access patterns). The security manager may be hosted locally by the management controller or by a remote device (e.g., a server).

The security manager may obtain the user access data from the management controller via out-of-band communication methods. In doing so, the user access data can be monitored and analyzed by the security manager without relying on in-band components, allowing for the security manager to provide data security services even if the in-band components become compromised or inoperable.

For example, the security manager may be hosted by a server responsible for providing the data security services. An unauthorized user may obtain access to the data processing system and begin copying data from the data processing system. To avoid detection, the unauthorized user may disconnect the data processing system from the network. By disconnecting from the network, the in-band components may be unable to communicate with the server. However, the management controller may continue to provide user access data to the server via an out-of-band communication channel. By doing so, the security manager may detect anomalies in the user access data indicative of unauthorized user activity, and may provide a response to the data processing system including predictions regarding the level of data vulnerability of the data processing system. The management controller may obtain a security policy which may include an action set, and may perform the action set to update an operating state of the data processing system to reduce the level of data vulnerability.

Thus, embodiments disclosed herein may address, among other technical problems, the technical challenge of providing data security services using an inference model via out-of-band methods. By providing the user access data to the security manager using out-of-band components and without traversing potentially compromised and/or inoperable in-band components, the data security services may be provided reliably and consistently. The management controller may then update the operating state of the data processing system to reduce the level of data vulnerability, resulting in the data processing system being more likely to provide computer-implemented services in a secured manner.

In an embodiment, a method for managing operation of a data processing system is disclosed. The method may include: providing, by a management controller of the data processing system from hardware resources of the data processing system, user access data for the data processing system to a security manager; obtaining, by the management controller, a response from the security manager based on the user access data; in a first instance of the obtaining where the response indicates that the data processing system is exhibiting a level of data vulnerability that meets criteria; obtaining, by the management controller, a security policy, the security policy comprising an action set for updating the operation of the data processing system; and performing, by the management controller, the action set to update an existing operating state of the data processing system to a new operating state of the data processing system to reduce the level of data vulnerability exhibited by the data processing system.

The user access data may include at least one type of data selected from a list of types of data consisting of: data regarding reading of data from the data processing system; data regarding modification of data on the data processing system; data regarding copying of data from the data processing system; and data regarding moving of data on the data processing system.

The security manager may be configured to use an inference model to generate predictions regarding the level of data vulnerability of the data processing system.

The security manager may be hosted by the management controller of the data processing system.

The security manager may be hosted by a remote device.

The criteria may indicate a level of confidence in a prediction from the response, and the level of confidence, when met, may indicate that the level of data vulnerability exceeds a maximum acceptable level.

The prediction may indicate portions of data hosted by the data processing system that are likely to be accessed by unauthorized entities.

The action set may include at least one action selected from a group of actions consisting of: locking the data processing system for use; disabling a portion of functionality of the data processing system; and removing data from the data processing system.

The response may be based on an inference model, and the inference model may be based on historic data access patterns for the data processing system by users of the data processing system while the use of the data processing system is verified as being by the users of the data processing system.

The data processing system may include a network module adapted to separately advertise network endpoints for the management controller and hardware resources of the data processing system, the network endpoints being usable by a remote device to address communications to the hardware resources using an in-band communication channel and the management controller using the out-of-band communication channel.

The management controller and the network module may be on separate power domains from the hardware resources so that the management controller and the network module are operable while the hardware resources are inoperable.

The out-of-band communication channel may run through the network module, and an in-band communication channel that services the hardware resources may also run through the network module.

The network module may host a transmission control protocol/internet protocol (TCP/IP) stack to facilitate network communications via the out-of-band communication channel.

In an embodiment, a non-transitory media is provided that may include instructions that when executed by a processor cause the computer-implemented method to be performed.

In an embodiment, a data processing system is provided that may include the non-transitory media and a processor, and may perform the computer-implemented method when the computer instructions are executed by the processor.

Turning to FIG. 1A, a block diagram illustrating a system in accordance with an embodiment is shown. The system shown in FIG. 1A may provide for management of data processing systems that may provide, at least in part, computer-implemented services. The computer-implemented services may include any type and quantity of services including, for example, data services (e.g., data storage, access and/or control services), communication services (e.g., instant messaging services, video-conferencing services), and/or any other type of service that may be implemented with a computing device. The computer-implemented services may be provided by, for example, data processing systems 100, server 102, and/or any other type of devices (not shown in FIG. 1A). Other types of computer-implemented services may be provided by the system shown in FIG. 1A without departing from embodiments disclosed herein.

The system may include any number and/or type of data processing systems 100 (e.g., 100A-100N). Data processing systems 100 may include any number of hardware components (e.g., processors, memory modules, storage devices, communications devices). The hardware components may support execution of any number and types of applications (e.g., software components). Changes in available functionalities of the hardware and/or software components may provide for various types of different computer-implemented services to be provided over time.

As part of providing the computer-implemented services, a data processing system (e.g., data processing system 100A) may store files including sensitive data (e.g., credit card numbers, passwords, phone numbers, addresses, social security numbers). For example, data processing system 100A may be used by a retail company to process and store data regarding transactions made via credit card, including storing credit card numbers in a memory module. If an attempt is made to access the credit card numbers stored in the memory module, data processing system 100A may perform an authentication process to verify the user is authorized to access the credit card numbers (e.g., verifying user credentials).

Operation of and/or computer-implemented services provided by data processing system 100A may be negatively impacted if the data processing system is accessed by an unauthorized user. For example, an unauthorized user may steal an authorized user's credentials and may obtain access to the credit card numbers stored in data processing system 100A. In doing so, data processing system 100A may become inoperable, and/or may no longer be usable to provide data storage services.

To prevent unauthorized users from accessing data processing system 100A, a remote device (e.g., server 102) may provide data security management services for data processing system 100A. To perform the data security management services, server 102 may, for example, monitor user access data of data processing system 100A. Server 102 may (i) identify historic data access patterns from the user access data, (ii) detect deviations from historic data access patterns which may be indicative of unauthorized user access of data processing system 100A, and/or (iii) provide instructions to data processing system 100A to limit access of the unauthorized user.

However, the unauthorized user may take actions to disrupt the data security management services provided by server 102 in order to avoid detection. For example, the unauthorized user may disable the communication channel (e.g., by disconnecting from the network) between data processing system 100A and server 102. By disabling the communication channel, the unauthorized user may retain access to data processing system 100A, which may result in data processing system 100A becoming compromised and unable to provide any and/or a portion of the computer-implemented services.

Figure 1B:
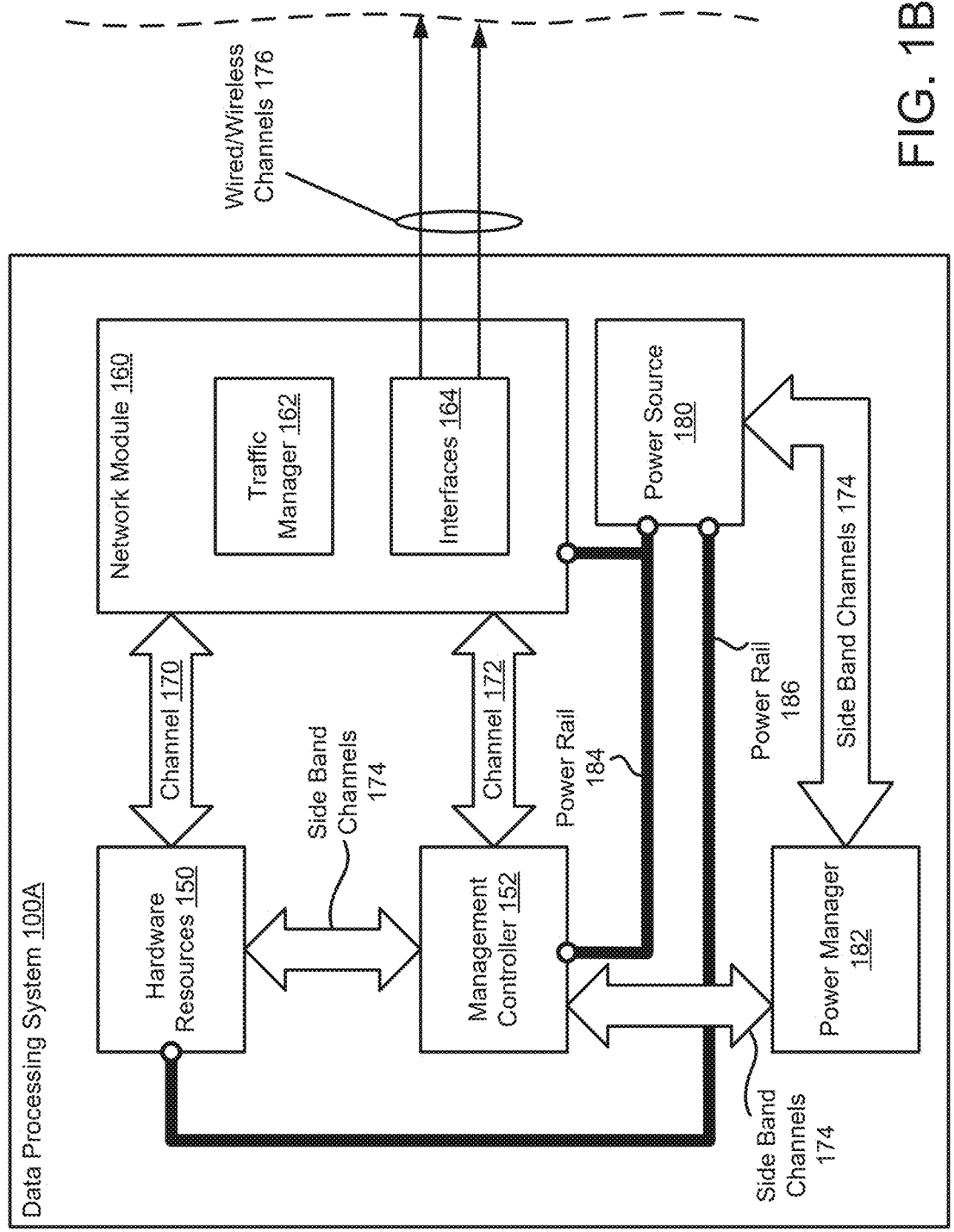
FIG. 1B shows a second block diagram illustrating a data processing system in accordance with an embodiment.

In general, embodiments disclosed herein may provide methods, systems, and/or devices for managing data security using out-of-band components of a data processing system (e.g., a management controller), refer to FIG. 1B. The out-of-band components of the data processing system may operate and communicate with a remote device (e.g., a server) without traversing in-band communication channels and without utilizing in-band components.

For example, the management controller may collect user access data from hardware resources of the data processing system and may provide the user access data to a security manager via an out-of-band communication channel. The security manager may use an inference model to obtain a level of data vulnerability exhibited by the data processing system based on the user access data. If the level of data vulnerability meets criteria, the management controller may perform an action set in accordance with a security policy to reduce the level of data vulnerability exhibited by the data processing system.

By doing so, a system in accordance with an embodiment may increase the likelihood of detecting unauthorized user access of the data processing system by avoiding the use of in-band components and communication channels which may be made inoperable and/or unreliable by the unauthorized user. Additionally, the management controller may retain the ability to enforce the security policy to limit access to the data processing system by the unauthorized user, even if hardware resources are not accessible via in-band components or communication channels (e.g., disconnected from the network).

To perform the above-mentioned functionality, the system of FIG. 1A may include data processing systems 100, and/or server 102. Data processing systems 100, server 102, and/or any other type of devices not shown in FIG. 1A may perform all, or a portion of the computer-implemented services independently and/or cooperatively. Each of these components is discussed below.

Data processing systems 100 may include any number and/or type of data processing systems (e.g., 100A-100N). Data processing systems 100 may include out-of-band components (e.g., a network module, a management controller) and functionality that may allow data exchange between the out-of-band components independently from in-band components (e.g., hardware resources) of data processing systems 100. For more information regarding out-of-band components of data processing systems 100, refer to the discussion of FIG. 1B.

The management controller of a data processing system (e.g., data processing system 100A) may provide data security management services. To provide the data security management services, the management controller may (i) obtain user access data from hardware resources of data processing system 100A, (ii) process and/or transform the user access data, (iii) use the user access data as ingest for an inference model hosted by the management controller, (iv) provide the user access data to a remote device via out-of-band communication channels, (v) obtain data (e.g., computing instructions) from the remote device in response, (vi) facilitate updating of the operation of data processing system 100A (e.g., based on the computing instructions), and/or (vii) perform other actions related to providing data security management services. Data processing system 100A may provide user access data, for example, to server 102, which may participate in managing operation of data processing system 100A.

Server 102 may include any number and/or type of remote devices (e.g., other data processing systems, management systems, storage devices, user devices) that may provide computer-implemented services (e.g., data security management services, location-based services, device management services). To perform its functionality, server 102 may communicate (e.g., exchange data) with the out-of-band components of data processing systems 100 using out-of-band communication channels. For example, server 102 may provide data security management services for data processing system 100A via the management controller of data processing system 100A (e.g., bypassing any in-band components of data processing system 100A).

To provide the data security management services, server 102 may (i) obtain user access data (e.g., via out-of-band communication channels from the management controller of data processing system 100A), (ii) monitor, manage and/or store the user access data (e.g., in a repository, not shown), (iii) process and/or transform the user access data, (iv) aggregate the user access data, (v) use the user access data as training data for an inference model, (vi) use the user access data as ingest for an inference model hosted by server 102, (vii) provide the inference model to the management controller of data processing system 100A, (viii) provide responses to data processing system 100A (e.g., computing instructions based on the output of the inference model) and/or (ix) perform other tasks related to providing data security management services.

Thus, data security management services for data processing systems 100 may be provided using out-of-band methods (e.g., using out-of-band components and/or via out-of-band communication channels). By doing so, the operation of data processing systems 100 may be monitored and/or updated without relying on potentially compromised and/or inoperable in-band components. Additionally, by using an inference model to manage the data security of data processing systems 100, unauthorized user access may be detected even when other access control systems (e.g., verifying the user using user credentials) fails. As a result, unauthorized user access of data processing systems 100 may be more likely to be detected and limited, which may result in the computer-implemented services provided by data processing systems 100 being less likely to be delayed, interrupted, and/or compromised.

Figure 3:
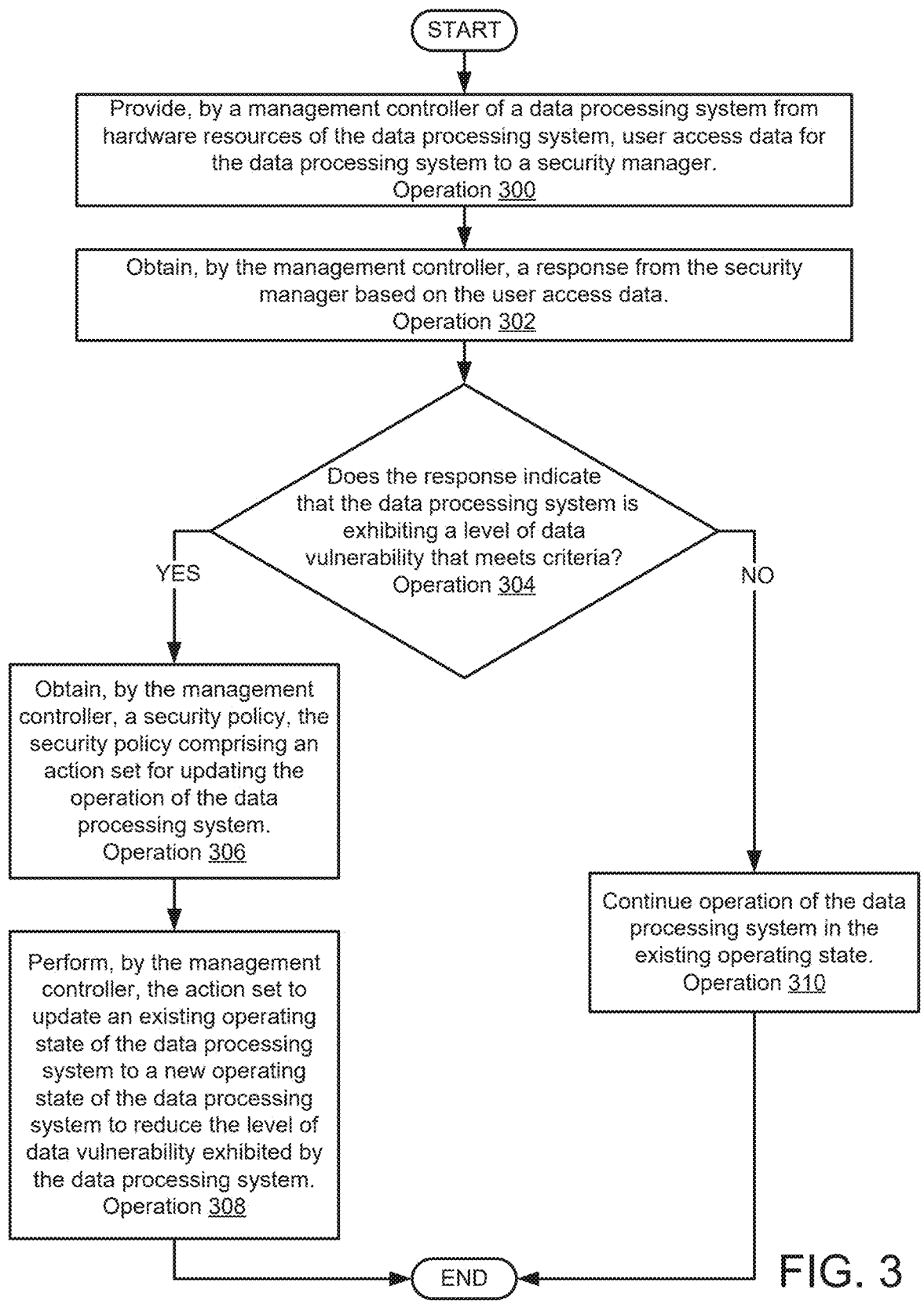
FIG. 3 shows a flow diagram illustrating a method of managing a data processing system in accordance with an embodiment.

When providing their functionality, any of data processing systems 100 and/or server 102 may perform all, or a portion of the methods shown in FIG. 3.

Any of (and/or components thereof) data processing systems 100 and/or server 102 may be implemented using a computing device (also referred to as a data processing system) such as a host or a server, a personal computer (e.g., desktops, laptops, and tablets), a "thin" client, a personal digital assistant (PDA), a Web enabled appliance, a mobile phone (e.g., smartphone), an embedded system, local controllers, an edge node, and/or any other type of data processing device or system. For additional details regarding computing devices, refer to FIG. 4.

In an embodiment, one or more of data processing systems 100 and/or server 102 are implemented using an internet of things (IoT) device, which may include a computing device. The IoT device may operate in accordance with a communication model and/or management model known to data processing systems 100, server 102, and/or other devices.

Any of the components illustrated in FIG. 1A may be operably connected to each other (and/or components not illustrated) with communication system 104. In an embodiment, communication system 104 includes one or more networks that facilitate communication between any number of components. The networks may include wired networks and/or wireless networks (e.g., and/or the Internet). The networks may operate in accordance with any number and/or types of communication protocols (e.g., such as the internet protocol).

While illustrated in FIG. 1A as including a limited number of specific components, a system in accordance with an embodiment may include fewer, additional, and/or different components than those illustrated therein. For example, while the system of FIG. 1A shows a single server (e.g., 102), it will be appreciated that the system may include any number of servers.

Turning to FIG. 1B, a diagram illustrating a data processing system in accordance with an embodiment is shown. The data processing system (e.g., data processing system 100A) shown in FIG. 1B may be similar to any of the computing devices (e.g., data processing systems 100) shown in FIG. 1A.

To provide computer-implemented services, data processing system 100A may include any quantity of hardware resources 150. Hardware resources 150 may be in-band hardware components, and may include a processor operably coupled to memory, storage, and/or other hardware components. Hardware resources 150 may (e.g., via the processor) provide the computer-implemented services desired by users of data processing system 100A.

The processor may host various management entities such as operating systems, drivers, network stacks, and/or other software entities that provide various management functionalities. For example, the operating system and drivers may provide abstracted access to various hardware resources.

To facilitate communication, hardware resources 150 may host a network stack that may facilitate packaging, transmission, routing, and/or other functions with respect to exchanging data with other devices. For example, the network stack may support transmission control protocol/internet protocol communication (TCP/IP) (e.g., the Internet protocol suite) thereby allowing the hardware resources 150 to communicate with other devices via packet switched networks and/or other types of communication networks.

The processor may also host various applications that provide the computer-implemented services. The applications may utilize various services provided by the management entities and use (at least indirectly) the network stack to communicate with other entities.

However, use of the network stack and the services provided by the management entities may place the applications at risk of indirect compromise. For example, if any of these entities trusted by the applications are compromised, these entities may subsequently compromise the operation of the applications. Additionally, if various drivers and/or the communication stack are compromised, communications to/from other devices may be compromised. If the applications trust these communications, then the applications may also be compromised.

For example, to communicate with other entities, an application may generate and send communications to a network stack and/or driver, which may subsequently transmit a packaged form of the communication via channel 170 to a communication component, which may then send the packaged communication (in a yet further packaged form, in some embodiments, with various layers of encapsulation being added depending on the network environment outside of data processing system 100A) to another device via any number of intermediate networks (e.g., via wired/wireless channels 176 that are part of the networks).

In addition, different configurations of hardware resources 150 and/or software resources may be implemented by data processing system 100A based on the type of computer-implemented services that are to be provided. Modifications to configurations of hardware resources 150 and/or the software resources may lead to downtime for data processing system 100A and may consume network bandwidth of channel 170.

To reduce the downtime of data processing system 100A and to reduce the likelihood of the applications and/or other in-band entities from being indirectly compromised, data processing system 100 may include management controller 152 and network module 160. Each of these components of data processing system 100A is discussed below.

Management controller 152 may operate independently from hardware resources 150 and, therefore, hardware resources 150 may not host and/or manage operation of management controller 152. In addition, management controller 152 may be distinct from hardware resources 150 and, therefore, may be physically separate from hardware resources 150. Management controller 152 may also be operably connected to communication components of data processing system 100A via separate channels (e.g., 172) from the in-band components.

Management controller 152 may be implemented, for example, using a system on a chip or other type of independently operating computing device (e.g., independent from the in-band components, such as hardware resources 150, of a host data processing system 100A). Management controller 152 may provide various management functionalities for data processing system 100A. For example, management controller 152 may monitor various ongoing processes performed by the in-band components, may manage power distribution, thermal management, and/or other functions of data processing system 100A.

To do so, management controller 152 may be operably connected to various components via side band channels 174 (in FIG. 1B, a limited number of side band channels are included for illustrative purposes, it will be appreciated that management controller 152 may communicate with other components via any number of side band channels). The side band channels may be implemented using separate physical channels, and/or with a logical channel overlay over existing physical channels (e.g., logical division of in-band channels). The side band channels may allow management controller 152 to interface with other components and implement various management functionalities such as, for example, general data retrieval (e.g., to snoop ongoing processes), telemetry data retrieval (e.g., to identify a health condition/other state of another component), function activation (e.g., sending instructions that cause the receiving component to perform various actions such as displaying data, adding data to memory, causing various processes to be performed), and/or other types of management functionalities.

For example, to reduce the likelihood of indirect compromise of an application hosted by hardware resources 150, management controller 152 may enable information from other devices to be provided to the application without traversing the network stack and/or management entities of hardware resources 150. To do so, the other devices may direct communications including the information to management controller 152.

Management controller 152 may then, for example, send the information via side band channels 174 to hardware resources 150 (e.g., to store it in a memory location accessible by the application, such as a shared memory location, a mailbox architecture, or other type of memory-based communication system) to provide it to the application. Thus, the application may receive and act on the information without the information passing through potentially compromised entities. Consequently, the information may be less likely to also be compromised, thereby reducing the possibility of the application becoming indirectly compromised. Similar processes may be used to facilitate outbound communications from the applications.

Information provided to the application by management controller 152 may include, for example, instructions for implementation of computer-implemented services desired by users of data processing system 100A.

To facilitate communication with other devices, data processing system 100A may include network module 160. Network module 160 may provide communication services for in-band components and out-of-band components (e.g., management controller 152) of data processing system 100A.

To provide the above-described functionalities, network module 160 may include traffic manager 162, interfaces 164, and may host an instance of a TCP/IP stack to facilitate communication with other devices independently of any of the in-band components (e.g., does not rely on any hosted software, hardware components, etc.). Accordingly, compromise of any of hardware resources 150 and hosted component may not result in indirect compromise of network module 160, management controller 152, and entities hosted by management controller 152.

Management controller 152 may be operably connected to communication components of data processing system 100A via separate channels (e.g., 172) from the in-band components, and may implement or otherwise utilize a distinct and independent network stack (e.g., TCP/IP). Consequently, management controller 152 may communicate with other devices independently of any of the in-band components (e.g., does not rely on any hosted software, hardware components, etc.). Accordingly, compromise of any of hardware resources 150 and hosted component may not result in indirect compromise of any management controller 152, and entities hosted by management controller 152.

To facilitate communication with other devices, data processing system 100A may include network module 160. Network module 160 may provide communication services for in-band components and out-of-band components (e.g., management controller 152) of data processing system 100A. Specifically, an out-of-band communication channel (e.g., 172) that services management controller 152 and an in-band communication channel (e.g., 170) that services hardware resources 150 may run through network module 160. Network module 160 may host a TCP/IP stack to facilitate network communications via the out-of-band communication channel. To do so, network module 160 may include traffic manager 162 and interfaces 164.

Traffic manager 162 may include functionality to (i) discriminate traffic directed to various network endpoints advertised by data processing system 100A, and (ii) forward the traffic to/from the entities associated with the different network endpoints. For example, to facilitate communications with other devices, network module 160 may advertise different network endpoints (e.g., different media access control address/internet protocol addresses) for the in-band components and out-of-band components. Thus, other entities may address communications to these different network endpoints. When such communications are received by network module 160, traffic manager 162 may discriminate and direct the communications accordingly (e.g., over channel 170 or channel 172, in the example shown in FIG. 1B, it will be appreciated that network module 160 may discriminate traffic directed to any number of data units and direct it accordingly over any number of channels).

Accordingly, traffic directed to management controller 152 may never flow through any of the in-band components. Likewise, outbound traffic from the out-of-band component may never flow through the in-band components.

To support inbound and outbound traffic, network module 160 may include any number of interfaces 164. Interfaces 164 may be implemented using any number and type of communication devices which may each provide wired and/or wireless communication functionality. For example, interfaces 164 may include a wide area network card, a WiFi card, a wireless local area network card, a wired local area network card, an optical communication card, a radio access network (RAN) card, a wide area network (WAN) card, and/or other types of communication components. These components may support any number of wired/wireless channels 176.

Thus, from the perspective of an external device, the in-band components and out-of-band components of data processing system 100A may appear to be two independent network entities, which may be independently addressable, and otherwise unrelated to one another.

Network module 160 may utilize the instance of the TCP/IP stack to allow hardware resources 150 and/or management controller 152 to communicate with other devices via packet switched networks and/or other types of communication networks.

To facilitate management of data processing system 100A over time, hardware resources 150, management controller 152 and/or network module 160 may be positioned in separately controllable power domains. By being positioned in these separately controllable power domains, different subsets of these components may remain powered while other subsets are unpowered.

For example, management controller 152 and network module 160 may remain powered while hardware resources 150 is unpowered. Consequently, management controller 152 may remain able to communicate with other devices even while hardware resources 150 are inactive. Similarly, management controller 152 may perform various actions while hardware resources 150 are not powered and/or are otherwise inoperable, unable to cooperatively perform various process, are compromised, and/or are unavailable for other reasons.

To implement the separate power domains, data processing system 100A may include a power source (e.g., 180) that separately supplies power to power rails (e.g., 184, 186) that power the respective power domains. Power from the power source (e.g., a power supply, battery, etc.) may be selectively provided to the separate power rails to selectively power the different power domains. A power manager (e.g., 182) may manage power from power source 180 that is supplied to the power rails (e.g., by providing instructions via side band channels 174). Management controller 152 may cooperate with power manager 182 to manage supply of power to these power domains. Management controller 152 may communicate with power manager 182 via side band channels 174 and/or via other means.

In FIG. 1B, an example implementation of separate power domains using power rails 184-186 is shown. The power rails may be implemented using, for example, bus bars or other types of transmission elements capable of distributing electrical power. While not shown, it will be appreciated that the power domains may include various power management components (e.g., fuses, switches, etc.) to facilitate selective distribution of power within the power domains.

Figure 2A:
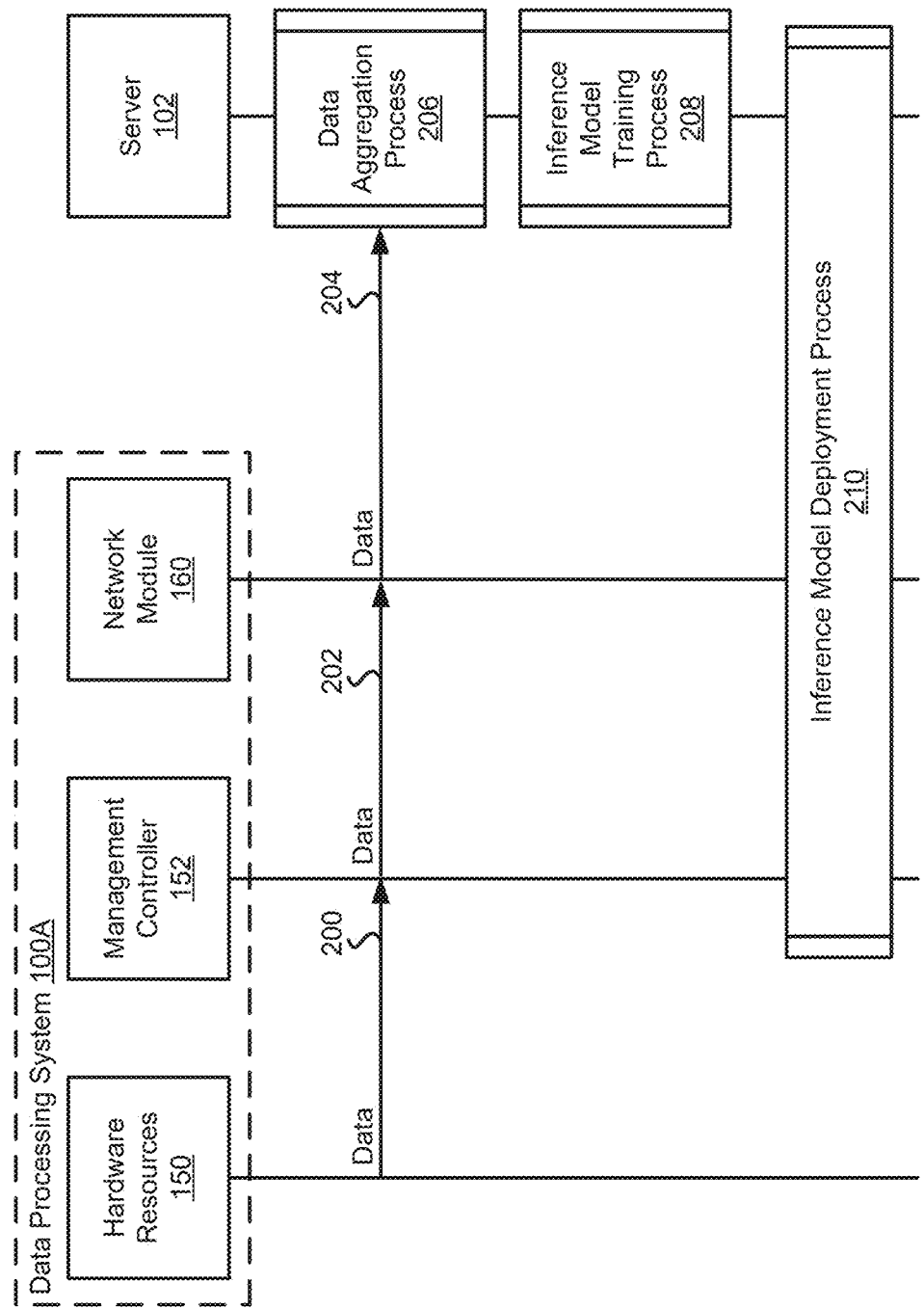
Figure 2B:
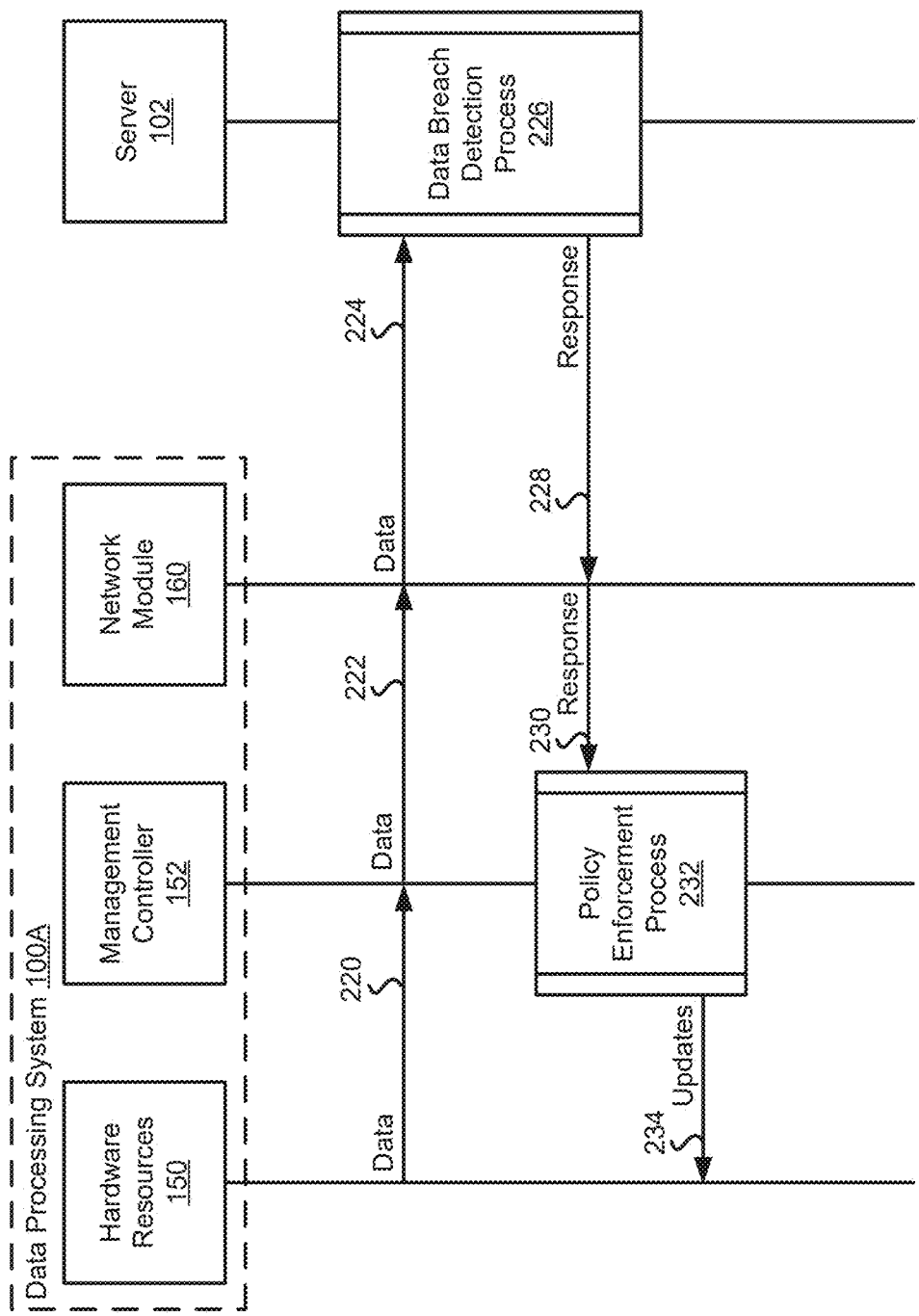

When providing its functionality, management controller 152 may perform all, or a portion, of the methods and operations described in FIGS. 2A-2C.

While illustrated in FIG. 1B with a limited number of specific components, a system may include additional, fewer, and/or different components without departing from embodiments disclosed herein.

To further clarify embodiments disclosed herein, interaction diagrams in accordance with an embodiment are shown in FIGS. 2A-2C. The interaction diagrams may illustrate examples of how data may be obtained and used within the systems of FIGS. 1A-1B.

In the interaction diagrams, processes performed by and interactions between components of a system in accordance with an embodiment are shown. In the diagrams, components of the system are illustrated using a first set of shapes (e.g., 150, 152, etc.), located towards the top of each figure. Lines descend from these shapes. Processes performed by the components of the system are illustrated using a second set of shapes (e.g., 206, 208, etc.) superimposed over these lines.

Interactions (e.g., communication, data transmissions, etc.) between the components of the system are illustrated using a third set of shapes (e.g., 200, 202, etc.) that extend between the lines. The third set of shapes may include lines terminating in one or two arrows. Lines terminating in a single arrow may indicate that one-way interactions (e.g., data transmission from a first component to a second component) occur, while lines terminating in two arrows may indicate that multi-way interactions (e.g., data transmission between two components) occur.

Generally, the processes and interactions are temporally ordered in an example order, with time increasing from the top to the bottom of each page. For example, the interaction labeled as 200 may occur prior to the interaction labeled as 202. However, it will be appreciated that the processes and interactions may be performed in different orders, any may be omitted, and other processes or interactions may be performed without departing from embodiments disclosed herein.

The processes shown in FIGS. 2A-2C may be performed by any entity shown in the systems of FIGS. 1A-1B (e.g., a device similar data processing system 100A, a server similar to server 102, etc.) and/or another entity without departing from embodiments disclosed herein.

Turning to FIG. 2A, a first interaction diagram in accordance with an embodiment is shown. The first interaction diagram may illustrate processes and interactions that may occur during training and deployment of an inference model used (e.g., by a management controller, by a server) in providing data security management services for a data processing system (e.g., data processing system 100A).

To provide data security management services, an inference model may be used to monitor and/or detect unauthorized user access of data processing system 100A. To train the inference model, user access data may be obtained by management controller 152 of data processing system 100A. Management controller 152 may obtain the user access data from hardware resources 150 at interaction 200. Management controller 152 may directly read the data from storage devices of hardware resources 150 using block level reads, or may use an agent hosted by the hardware resources that may support file-level reads.

The user access data may include (i) data regarding reading of data from data processing system 100A, (ii) data regarding modification of data on data processing system 100A, (iii) data regarding copying of data from data processing system 100A, (iv) data regarding moving of data on data processing system 100A, and/or (v) other types of data.

Management controller 152 may provide the user access data to network module 160 at interaction 202 via an out-of-band communication channel. Network module 160 may provide the user access data to server 102 via an out-of-band communication channel at interaction 204.

Server 102 may use the user access data to perform data aggregation process 206. During data aggregation process 206, server 102 may collect user access data for data processing system 100A over a duration of time while the use of data processing system 100A is verified as being by the users of data processing system 100A. Server 102 may (i) combine the user access data, (ii) fill gaps in the user access data, (iii) transform the user access data, (iv) extract values from the user access data, and/or (v) perform other tasks to prepare the user access data to be used as a training dataset for an inference model. For example, the training data may associate access patterns with corresponding labels (e.g., known user access pattern).

The training dataset may then be used by server 102 to perform inference model training process 208. During inference model training process 208, an inference model may be selected (e.g., machine learning, decision tree, linear regression) and the training dataset may define goals for predictions made by the inference model. Parameters of the inference model may be selected using an optimization process (e.g., an objective function may be defined in terms of the training dataset and predictions made by the inference model, and a global optimization method such as the gradient descent may be used to identify parameters that most faithfully reproduce the trends in the training dataset). In doing so, an inference model may be trained using the user access data over the duration of time to identify historic data access patterns for data processing system 100A.

While described with respect to supervised learning, it will be appreciated that semi and/or self-supervised learning may be performed without departing from embodiments disclosed herein. For example, the user access patterns may be clustered to obtain clusters associated with a typical access patterns, and distances between new access patterns and the clusters may be calculated and compared to a threshold to identify whether the new access pattern is likely by a trusted or unauthorized user.

Once the parameters of the inference model are set, the inference model may be used to make predictions. For example, the inference model may be used to make predictions regarding a level of data vulnerability of data processing system 100A. The inference model may make the predictions by comparing current user access data for data processing system 100A to the historic data access patterns to identify anomalies. The anomalies may indicate that at least a portion of the data stored on data processing system 100A exhibits a level of vulnerability (e.g., due to malicious access by an unauthorized user).

The inference model may be deployed during inference model deployment process 210. To perform inference model deployment process 210, the inference model may be provided to a security manager. The security manager may (i) obtain user access data for data processing system 100A from the management controller, (ii) be configured to use the inference model to generate predictions regarding the level of data vulnerability of data processing system 100A based on the user access data, (iii) provide a response to the management controller of data processing system 100A, the response being based on the inference model (e.g., the predictions generated by the inference model), and/or (iv) perform other actions to provide security management services for data processing system 100A.

The security manager may be hosted by a remote device (e.g., server 102) and/or the security manager may be hosted by management controller 152. To deploy the inference model to the security manager hosted by management controller 152, the inference model may be provided to network module 160, which may then provide the inference model to management controller 152. For additional details regarding the security manager hosted by server 102, refer to FIG. 2B. For additional details regarding the security manager hosted by management controller 152, refer to FIG. 2C.

Thus, as shown in FIG. 2A, an inference model may be trained using user access data to identify historic data access patterns for a data processing system. The inference model may generate predictions regarding a level of data vulnerability for the data processing system based on user access data obtained via out-of-band communication channels. A security manager may be configured to use the inference model, and may be hosted by a server and/or the management controller of the data processing system. By doing so, the security manager may provide data security management services for the data processing system via out-of-band methods, which may increase the likelihood of identifying data vulnerability, even if the in-band components become compromised and/or inoperable.

Turning to FIG. 2B, a second interaction diagram in accordance with an embodiment is shown. The second interaction diagram may illustrate processes and interactions that may be used to reduce a level of data vulnerability detected by a security manager hosted by a remote device (e.g., server 102). Refer to FIG. 2C for an example interaction where the security manager is hosted by a management controller.

To reduce the level of data vulnerability, user access data for data processing system 100A may be provided to the security manager hosted by server 102 via out-of-band methods. To provide the user access data to the security manager, management controller 152 may obtain user access data for data processing system 100A from hardware resources 150 at interaction 220. Management controller 152 may provide the user access data to network module 160 at interaction 222 via an out-of-band communication channel. Network module 160 may provide the user access data to server 102 at interaction 224 via an out-of-band communication channel.

For example, data processing system 100A may be a computer used by a retail company to process and store data regarding transactions made via credit card (e.g., credit card numbers, a list of customer names, a list of customer phone numbers and/or addresses, transaction history). A management controller of the computer (e.g., management controller 152) may obtain user access data and provide the user access data to a security manager hosted by a server responsible for providing security management services for the computer (e.g., server 102). The user access data for the computer may include data indicating that files including credit card numbers have been opened and copied multiple times within a day.

The user access data may be used by the security manager hosted by server 102 to perform data breach detection process 226. During data breach detection process 226, the security manager may use the inference model to generate predictions regarding the level of data vulnerability of the data processing system. Refer to FIG. 2A for additional details regarding the predictions generated by the inference model.

Management controller 152 may obtain a response from the security manager based on the inference model. To obtain the response, server 102 may provide the response to network module 160 at interaction 228. The response may then be provided to management controller 152 at interaction 230. The response may include (i) predictions generated by the inference model indicating portions of data hosted by data processing system 100A that are likely to be accessed by unauthorized entities, (ii) a level of confidence in the predictions, and/or (iii) other security data.

Continuing with the above example, the security manager may use the user access data for the computer and the inference model to generate predictions. For example, the inference model may generate predictions identifying that the user access data regarding opening and copying of files including credit card numbers is anomalous based on historic data access patterns for the computer. The security manager may issue a response to the management controller including the predictions and a level of confidence in the predictions.

Management controller 152 may use the response to perform policy enforcement process 232. During policy enforcement process 232, management controller 152 may determine the response indicates that data processing system 100A is exhibiting a level of data vulnerability that meets criteria. The criteria may indicate a level of confidence in a prediction from the response, and the level of confidence, when met, may indicate that the level of data vulnerability exceeds a maximum acceptable level.

Continuing with the above example, management controller 152 may obtain the response from the security manager including predictions indicating the files including credit card numbers are exhibiting a level of data vulnerability and a level of confidence in the predictions. Management controller 152 may determine that the level of confidence meets criteria indicating the level of data vulnerability of the credit card numbers exceeds a maximum acceptable level.

If management controller 152 determines the response meets the criteria, management controller 152 may obtain a security policy. Obtaining the security policy may include (i) receiving the security policy from another device (e.g., server 102), (ii) reading the security policy from storage, and/or (iii) other methods. The security policy may include a set of rules to manage data and/or protect data from being accessed by unauthorized entities. The security policy may include an action set for updating operation of data processing system 100A.

Once the security policy including the action set for updating operation of data processing system 100A has been obtained, management controller 152 may perform the action set by providing updates to hardware resources 150 at interaction 234. Performing the action set may include updating an existing operating state of data processing system 100A to a new operating state of data processing system 100A to reduce the level of data vulnerability exhibited by data processing system 100A. The action set may include (i) locking data processing system 100A for use, (ii) disabling a portion of functionality of data processing system 100A, (iii) removing data from data processing system 100A, and/or (iv) other actions to secure data processing system 100A.

Continuing the above example, management controller 152 may read a security policy from storage, which may include an action set to be performed to reduce the level of vulnerability of the credit card numbers. Management controller 152 may perform the action set, which may include providing updates to hardware resources 150. The updates may include, for example, transferring the files including credit card numbers from a memory module of the computer to server 102. In doing so, the level of data vulnerability of the credit card numbers may be reduced by removing it from the potentially compromised computer.

Thus, as shown in FIG. 2B, a security manager hosted by a server may use an inference model to detect levels of data vulnerability for a data processing system. If the level of data vulnerability meets criteria, an action set may be performed by a management controller of the data processing system to reduce the level of data vulnerability.

Turning to FIG. 2C, a third interaction diagram in accordance with an embodiment is shown. The third interaction diagram may illustrate processes and interactions that may be used to reduce a level of data vulnerability detected by a security manager hosted by a management controller of a data processing system. Refer to FIG. 2B for an example interaction where the security manager is hosted by a server.

To reduce a level of data vulnerability, user access data for data processing system 100A may be provided to the security manager hosted by management controller 152. To provide the user access data to the security manager, management controller 152 may obtain user access data for data processing system 100A from hardware resources 150 at interaction 240.

The user access data may be used by the security manager hosted by management controller 152 to perform data breach detection process 242. During data breach detection process 242, the security manager may use the inference model and the user access data to generate predictions regarding the level of data vulnerability of data processing system 100A. Refer to FIG. 2A for additional details regarding the predictions generated by the inference model.

Management controller 152 may obtain a response from the security manager based on the inference model. Using the response, management controller 152 may perform policy enforcement process 232 and provide updates to hardware resources 150 at interaction 246. Refer to FIG. 2B for additional details regarding the response, policy enforcement process 232, and updating the operating state of data processing system 100A.

While the system is shown with one inference model (e.g., hosted by server 102, hosted by management controller 152), it will be appreciated that the system may use any number of inference models hosted by any of the entities without departing from embodiments disclosed herein. For example, a system may use two inference models, one hosted by server 102 and one hosted by management controller 152. The inference models may be used, for example, to monitor user access data with varying levels of sensitivity. For example, the inference model hosted by the management controller may be less sensitive, and may be used as a trigger to send user access data that is potentially anomalous to the inference model hosted by server 102. The inference model hosted by server 102 may be more sensitive and used to make more nuanced predictions regarding the level of data vulnerability. By doing so, multiple inference models may be deployed to provide a progressive elevation in data security monitoring.

Thus, as shown in FIG. 2C, a security manager hosted by a management controller of a data processing system may use an inference model to detect levels of data vulnerability for a data processing system and perform an action set if the level of data vulnerability meets criteria. Additionally, multiple inference models may be deployed to perform out-of-band data security management services.

Any of the processes illustrated using the second set of shapes and interactions illustrated using the third set of shapes may be performed, in part or whole, by digital processors (e.g., central processors, processor cores, etc.) that execute corresponding instructions (e.g., computer code/software). Execution of the instructions may cause the digital processors to initiate performance of the processes. Any portions of the processes may be performed by the digital processors and/or other devices. For example, executing the instructions may cause the digital processors to perform actions that directly contribute to performance of the processes, and/or indirectly contribute to performance of the processes by causing (e.g., initiating) other hardware components to perform actions that directly contribute to the performance of the processes.

Any of the processes illustrated using the second set of shapes and interactions illustrated using the third set of shapes may be performed, in part or whole, by special purpose hardware components such as digital signal processors, application specific integrated circuits, programmable gate arrays, graphics processing units, data processing units, and/or other types of hardware components. These special purpose hardware components may include circuitry and/or semiconductor devices adapted to perform the processes. For example, any of the special purpose hardware components may be implemented using complementary metal-oxide semiconductor based devices (e.g., computer chips).

Any of the processes and interactions may be implemented using any type and number of data structures. The data structures may be implemented using, for example, tables, lists, linked lists, unstructured data, data bases, and/or other types of data structures. Additionally, while described as including particular information, it will be appreciated that any of the data structures may include additional, less, and/or different information from that described above. The informational content of any of the data structures may be divided across any number of data structures, may be integrated with other types of information, and/or may be stored in any location.

As discussed above, the components of FIGS. 1A-2C may perform various methods to manage the data security of data processing systems. FIG. 3 illustrates a method that may be performed by the components of the system of FIGS. 1A-2C. In the diagram discussed below and shown in FIG. 3, any of the operations may be repeated, performed in different orders, and/or performed in parallel with or in a partially overlapping in a timely manner with other operations. The method described with respect to FIG. 3 may be performed by a data processing system, any component of a data processing system (e.g., a management controller, hardware resources) and/or another device.

Turning to FIG. 3, a flow diagram illustrating a method of managing a data processing system in accordance with an embodiment is shown. The method may be performed, for example, by a data processing system, a server, a communication system, a management controller of a data processing system, hardware resources of a data processing system, and/or any other entity without departing from embodiments disclosed herein.

At operation 300, a management controller of a data processing system may provide user access data for the data processing system from hardware resources of the data processing system to a security manager. Providing the user access data to the security manager may include (i) obtaining the user access data by the management controller from the hardware resources, (ii) reading the user access data by the security manager hosted by the management controller, (iii) providing the user access data to a network module via out-of-band methods, (iv) transmitting the user access data from the network module to the security manager hosted by a remote device, and/or (v) other methods.

At operation 302, the management controller may obtain a response from the security manager based on the user access data. Obtaining a response may include (i) generating the response by the security manager, (ii) receiving the response from the security manager hosted by the remote device via out-of-band methods, (iii) reading the response from the security manager hosted by the management controller.

Generating the response by the security manager may include (i) training the inference model using historic data access patterns for the data processing system by users of the data processing system while the use of the data processing system is verified as being by users of the data processing system, (ii) providing the user access data to the inference model as ingest, (iii) generating predictions based on the user access data regarding the level of data vulnerability of the data processing system, the predictions indicating portions of data hosted by the data processing system that are likely to be accessed by unauthorized entities, (iv) generating a level of confidence in the predictions, and/or (v) other methods.

At operation 304, a determination may be made regarding whether the response indicates that the data processing system is exhibiting a level of data vulnerability that meets criteria. Making the determination may include (i) obtaining criteria, the criteria indicating a level of confidence in a prediction from the response, and the level of confidence, when met, indicating that the level of data vulnerability exceeds a maximum acceptable level, (ii) comparing the level of confidence in the predictions from the response to the criteria to determine whether the level of confidence in the predictions meets the criteria, and/or (iii) other methods.

If it is determined that the response indicates that the data processing system is exhibiting a level of data vulnerability that meets criteria (e.g., the determination is "Yes" at operation 304), then the method may proceed to operation 306.

At operation 306, the management controller may obtain a security policy, the security policy including an action set for updating the operation of the data processing system. Obtaining the security policy may include (i) receiving the security policy from another device, (ii) reading the security policy from storage, and/or (iii) other methods.

At operation 308, the management controller may perform the action set to update an existing operating state of the data processing system to a new operating state of the data processing system to reduce the level of data vulnerability exhibited by the data processing system. Performing the action set may include (i) locking the data processing system for use (e.g., modifying a security state of the data processing system to prevent the use of the data processing system), (ii) disabling a portion of functionality of the data processing system (e.g., disabling hardware/software components of the data processing system), (iii) removing data from the data processing system (e.g., deleting data from the data processing system, transferring data from the data processing system to another device), and/or (iv) other methods.

The method may end following operation 308.

Returning to operation 304, if it is determined that the response does not indicate that the data processing system is exhibiting a level of data vulnerability that meets criteria (e.g., the determination is "No" at operation 304), then the method may proceed to operation 310.

At operation 310, operation of the data processing system may continue in the existing operating state (e.g., not making any changes to the data processing system based on the user access data provided by the data processing system).

The method may end following operation 310.

Using the methods illustrated in FIG. 3, embodiments disclosed herein may provide systems and methods usable to provide data security management services for a data processing system via out-of-band methods.

Figure 4:
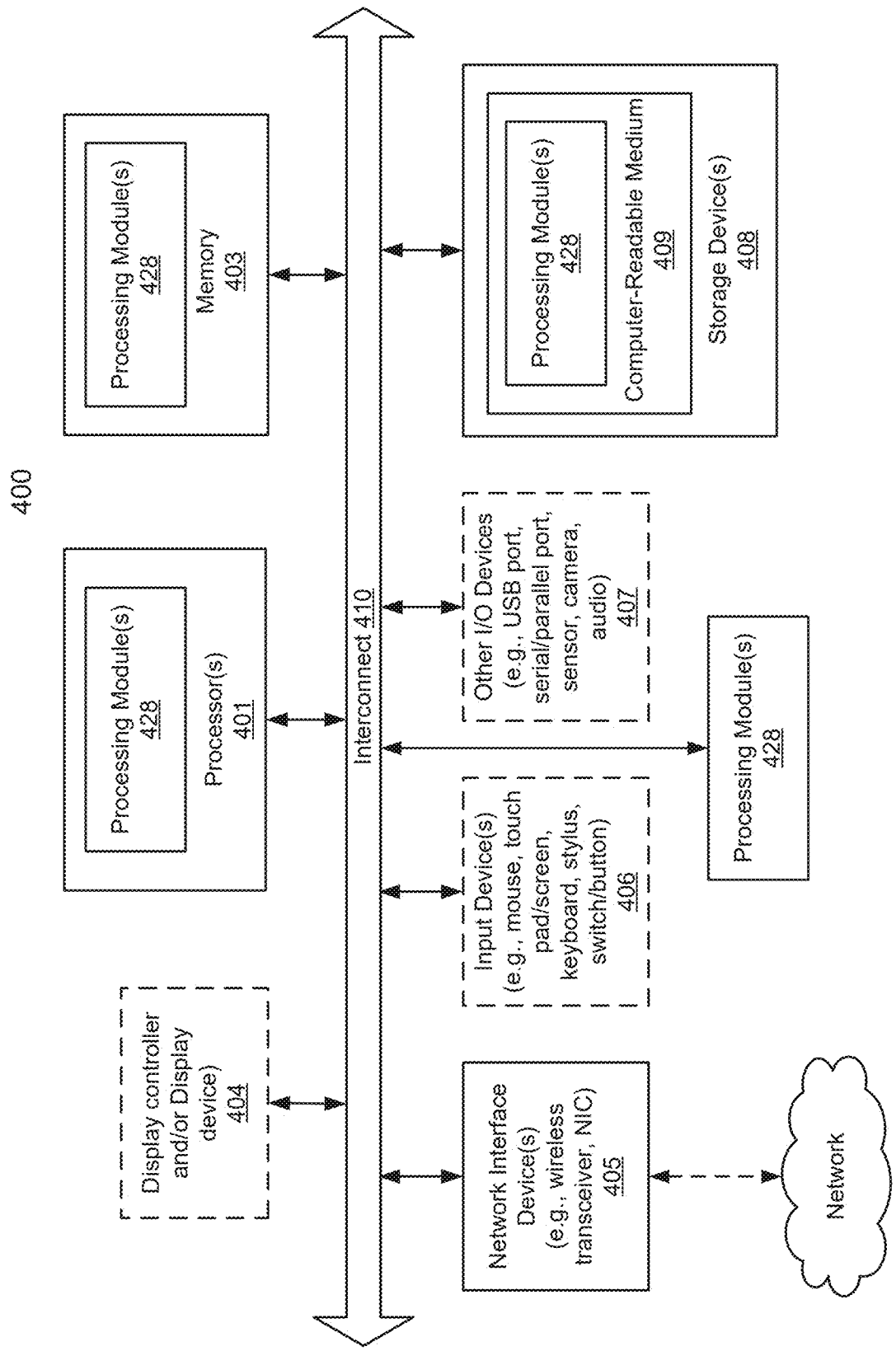
FIG. 4 shows a block diagram illustrating a data processing system in accordance with an embodiment.

Any of the components illustrated in FIGS. 1A-2C may be implemented with one or more computing devices. Turning to FIG. 4, a block diagram illustrating an example of a data processing system (e.g., a computing device) in accordance with an embodiment is shown. For example, system 400 may represent any of data processing systems described above performing any of the processes or methods described above. System 400 can include many different components. These components can be implemented as integrated circuits (ICs), portions thereof, discrete electronic devices, or other modules adapted to a circuit board such as a motherboard or add-in card of the computer system. Note also that system 400 is intended to show a high level view of many components of the computer system. However, it is to be understood that additional components may be present in certain implementations and furthermore, different arrangement of the components shown may occur in other implementations. System 400 may represent a desktop, a laptop, a tablet, a server, a mobile phone, a media player, a personal digital assistant (PDA), a personal communicator, a gaming device, a network router or hub, a wireless access point (AP) or repeater, a set-top box, or a combination thereof. Further, while only a single machine or system is illustrated, the term "machine" or "system" shall also be taken to include any collection of machines or systems that individually or jointly execute a set (or multiple sets) of instructions to perform any one or more of the methodologies discussed herein.

In one embodiment, system 400 includes processor 401, memory 403, and devices 405-407 via a bus or an interconnect 410. Processor 401 may represent a single processor or multiple processors with a single processor core or multiple processor cores included therein. Processor 401 may represent one or more general-purpose processors such as a microprocessor, a central processing unit (CPU), or the like. More particularly, processor 401 may be a complex instruction set computing (CISC) microprocessor, reduced instruction set computing (RISC) microprocessor, very long instruction word (VLIW) microprocessor, or processor implementing other instruction sets, or processors implementing a combination of instruction sets. Processor 401 may also be one or more special-purpose processors such as an application specific integrated circuit (ASIC), a cellular or baseband processor, a field programmable gate array (FPGA), a digital signal processor (DSP), a network processor, a graphics processor, a network processor, a communications processor, a cryptographic processor, a coprocessor, an embedded processor, or any other type of logic capable of processing instructions.

Processor 401 may communicate with memory 403, which in one embodiment can be implemented via multiple memory devices to provide for a given amount of system memory. Memory 403 may include one or more volatile storage (or memory) devices such as random access memory (RAM), dynamic RAM (DRAM), synchronous DRAM (SDRAM), static RAM (SRAM), or other types of storage devices. Memory 403 may store information including sequences of instructions that are executed by processor 401, or any other device. For example, executable code and/or data of a variety of operating systems, device drivers, firmware (e.g., input output basic system or BIOS), and/or applications can be loaded in memory 403 and executed by processor 401. An operating system can be any kind of operating systems, such as, for example, Windows® operating system from Microsoft®, Mac OS®/iOS® from Apple, Android® from Google®, Linux®, Unix®, or other real-time or embedded operating systems such as VxWorks.

System 400 may further include IO devices such as devices (e.g., 405, 406, 407, 408) including network interface device(s) 405, optional input device(s) 406, and other optional IO device(s) 407. Network interface device(s) 405 may include a wireless transceiver and/or a network interface card (NIC). The wireless transceiver may be a WiFi transceiver, an infrared transceiver, a Bluetooth transceiver, a WiMax transceiver, a wireless cellular telephony transceiver, a satellite transceiver (e.g., a global positioning system (GPS) transceiver), or other radio frequency (RF) transceivers, or a combination thereof. The NIC may be an Ethernet card.

Input device(s) 406 may include a mouse, a touch pad, a touch sensitive screen (which may be integrated with a display device of optional graphics subsystem 404), a pointer device such as a stylus, and/or a keyboard (e.g., physical keyboard or a virtual keyboard displayed as part of a touch sensitive screen). For example, input device(s) 406 may include a touch screen controller coupled to a touch screen. The touch screen and touch screen controller can, for example, detect contact and movement or break thereof using any of a plurality of touch sensitivity technologies, including but not limited to capacitive, resistive, infrared, and surface acoustic wave technologies, as well as other proximity sensor arrays or other elements for determining one or more points of contact with the touch screen.

IO devices 407 may include an audio device. An audio device may include a speaker and/or a microphone to facilitate voice-enabled functions, such as voice recognition, voice replication, digital recording, and/or telephony functions. Other IO devices 407 may further include universal serial bus (USB) port(s), parallel port(s), serial port(s), a printer, a network interface, a bus bridge (e.g., a PCI-PCI bridge), sensor(s) (e.g., a motion sensor such as an accelerometer, gyroscope, a magnetometer, a light sensor, compass, a proximity sensor, etc.), or a combination thereof. IO device(s) 407 may further include an imaging processing subsystem (e.g., a camera), which may include an optical sensor, such as a charged coupled device (CCD) or a complementary metal-oxide semiconductor (CMOS) optical sensor, utilized to facilitate camera functions, such as recording photographs and video clips. Certain sensors may be coupled to interconnect 410 via a sensor hub (not shown), while other devices such as a keyboard or thermal sensor may be controlled by an embedded controller (not shown), dependent upon the specific configuration or design of system 400.

To provide for persistent storage of information such as data, applications, one or more operating systems and so forth, a mass storage (not shown) may also couple to processor 401. In various embodiments, to enable a thinner and lighter system design as well as to improve system responsiveness, this mass storage may be implemented via a solid state device (SSD). However, in other embodiments, the mass storage may primarily be implemented using a hard disk drive (HDD) with a smaller amount of SSD storage to act as an SSD cache to enable non-volatile storage of context state and other such information during power down events so that a fast power up can occur on re-initiation of system activities. Also a flash device may be coupled to processor 401, e.g., via a serial peripheral interface (SPI). This flash device may provide for non-volatile storage of system software, including a basic input/output software (BIOS) as well as other firmware of the system.

Storage device 408 may include computer-readable storage medium 409 (also known as a machine-readable storage medium or a computer-readable medium) on which is stored one or more sets of instructions or software (e.g., processing module, unit, and/or processing module/unit/logic 428) embodying any one or more of the methodologies or functions described herein. Processing module/unit/logic 428 may represent any of the components described above. Processing module/unit/logic 428 may also reside, completely or at least partially, within memory 403 and/or within processor 401 during execution thereof by system 400, memory 403 and processor 401 also constituting machine-accessible storage media. Processing module/unit/logic 428 may further be transmitted or received over a network via network interface device(s) 405.

Computer-readable storage medium 409 may also be used to store some software functionalities described above persistently. While computer-readable storage medium 409 is shown in an exemplary embodiment to be a single medium, the term "computer-readable storage medium" should be taken to include a single medium or multiple media (e.g., a centralized or distributed database, and/or associated caches and servers) that store the one or more sets of instructions. The terms "computer-readable storage medium" shall also be taken to include any medium that is capable of storing or encoding a set of instructions for execution by the machine and that cause the machine to perform any one or more of the methodologies of embodiments disclosed herein. The term "computer-readable storage medium" shall accordingly be taken to include, but not be limited to, solid-state memories, and optical and magnetic media, or any other non-transitory machine-readable medium.

Processing module/unit/logic 428, components and other features described herein can be implemented as discrete hardware components or integrated in the functionality of hardware components such as ASICS, FPGAs, DSPs or similar devices. In addition, processing module/unit/logic 428 can be implemented as firmware or functional circuitry within hardware devices. Further, processing module/unit/logic 428 can be implemented in any combination hardware devices and software components.

Note that while system 400 is illustrated with various components of a data processing system, it is not intended to represent any particular architecture or manner of interconnecting the components; as such details are not germane to embodiments disclosed herein. It will also be appreciated that network computers, handheld computers, mobile phones, servers, and/or other data processing systems which have fewer components or perhaps more components may also be used with embodiments disclosed herein.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as those set forth in the claims below, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Embodiments disclosed herein also relate to an apparatus for performing the operations herein. Such a computer program is stored in a non-transitory computer readable medium. A non-transitory machine-readable medium includes any mechanism for storing information in a form readable by a machine (e.g., a computer). For example, a machine-readable (e.g., computer-readable) medium includes a machine (e.g., a computer) readable storage medium (e.g., read only memory ("ROM"), random access memory ("RAM"), magnetic disk storage media, optical storage media, flash memory devices).

The processes or methods depicted in the preceding figures may be performed by processing logic that comprises hardware (e.g., circuitry, dedicated logic, etc.), software (e.g., embodied on a non-transitory computer readable medium), or a combination of both. Although the processes or methods are described above in terms of some sequential operations, it should be appreciated that some of the operations described may be performed in a different order. Moreover, some operations may be performed in parallel rather than sequentially.

Embodiments disclosed herein are not described with reference to any particular programming language. It will be appreciated that a variety of programming languages may be used to implement the teachings of embodiments disclosed herein.

In the foregoing specification, embodiments have been described with reference to specific exemplary embodiments thereof. It will be evident that various modifications may be made thereto without departing from the broader spirit and scope of the embodiments disclosed herein as set forth in the following claims. The specification and drawings are, accordingly, to be regarded in an illustrative sense rather than a restrictive sense.

What is claimed is:

1. A method for managing operation of a data processing system, the method comprising:
    obtaining, from hardware resources of the data processing system, user access data;
    providing, by a management controller of the data processing system and via an out-of-band communication channel that connects the management controller to a network module, the user access data to a security manager, the network module being connected to the hardware resources via an in-band communication channel that is separate from the out-of-band communication channel;
    transmitting, from the management controller to a power source via a sideband communication channel that is separate from the out-of-band communication channel and the in-band communication channel, an instruction that controls the power source to supply power to the hardware resources in a first power domain via a first power rail and supply power to the management controller in a second power domain via a second power rail, the first power domain being different from the second power domain;
    obtaining, by the management controller, a response from the security manager based on the user access data;
    in a first instance of the obtaining where the response indicates that the data processing system is exhibiting a level of data vulnerability that meets criteria:
        obtaining, by the management controller, a security policy, the security policy comprising an action set for updating the operation of the data processing system; and
        performing, by the management controller, the action set to update an existing operating state of the data processing system to a new operating state of the data processing system to reduce the level of data vulnerability exhibited by the data processing system.

2. The method of claim 1, wherein the user access data comprises at least one type of data selected from a list of types of data consisting of:
    data regarding reading of data from the data processing system;
    data regarding modification of data on the data processing system;
    data regarding copying of data from the data processing system; and
    data regarding moving of data on the data processing system.

3. The method of claim 1, wherein the security manager is configured to use an inference model to generate predictions regarding the level of data vulnerability of the data processing system.

4. The method of claim 3, wherein the security manager is hosted by the management controller of the data processing system.

5. The method of claim 3, wherein the security manager is hosted by a remote device.

6. The method of claim 1, wherein the criteria indicate a level of confidence in a prediction from the response, and the level of confidence, when met, indicates that the level of data vulnerability exceeds a maximum acceptable level.

7. The method of claim 6, wherein the prediction indicates portions of data hosted by the data processing system that are likely to be accessed by unauthorized entities.

8. The method of claim 1, wherein the action set comprises at least one action selected from a group of actions consisting of:

locking the data processing system for use;
disabling a portion of functionality of the data processing system; and
removing data from the data processing system.

9. The method of claim 1, wherein the response is based on an inference model, and the inference model being based on historic data access patterns for the data processing system by users of the data processing system while the use of the data processing system is verified as being by the users of the data processing system.

10. The method of claim 1, wherein the network module is adapted to separately advertise network endpoints for the management controller and the hardware resources of the data processing system, the network endpoints being usable by a remote device to address communications to the hardware resources using the in-band communication channel and the management controller using the out-of-band communication channel.

11. The method of claim 10, wherein the management controller and the network module are on separate power domains from the hardware resources so that the management controller and the network module are operable while the hardware resources are inoperable.

12. The method of claim 10, wherein the out-of-band communication channel runs through the network module, and the in-band communication channel that services the hardware resources also runs through the network module.

13. The method of claim 10, wherein the network module hosts a transmission control protocol/internet protocol (TCP/IP) stack to facilitate network communications via the out-of-band communication channel.

14. A non-transitory machine-readable medium having instructions stored therein, which when executed by a processor, cause the processor to perform operations for managing operation of a data processing system, the operations comprising:
    obtaining, from hardware resources of the data processing system, user access data;
    providing, by a management controller of the data processing system and via an out-of-band communication channel that connects the management controller to a network module, the user access data to a security manager, the network module being connected to the hardware resources via an in-band communication channel that is separate from the out-of-band communication channel;
    transmitting, from the management controller to a power source via a sideband communication channel that is separate from the out-of-band communication channel and the in-band communication channel, an instruction that controls the power source to supply power to the hardware resources in a first power domain via a first power rail and supply power to the management controller in a second power domain via a second power rail, the first power domain being different from the second power domain;
    obtaining, by the management controller, a response from the security manager based on the user access data;
    in a first instance of the obtaining where the response indicates that the data processing system is exhibiting a level of data vulnerability that meets criteria:
        obtaining, by the management controller, a security policy, the security policy comprising an action set for updating the operation of the data processing system; and
        performing, by the management controller, the action set to update an existing operating state of the data processing system to a new operating state of the data processing system to reduce the level of data vulnerability exhibited by the data processing system.

15. The non-transitory machine-readable medium of claim 14, wherein the user access data comprises at least one type of data selected from a list of types of data consisting of:
    data regarding reading of data from the data processing system;
    data regarding modification of data on the data processing system;
    data regarding copying of data from the data processing system; and
    data regarding moving of data on the data processing system.

16. The non-transitory machine-readable medium of claim 14, wherein the security manager is configured to use an inference model to generate predictions regarding the level of data vulnerability of the data processing system.

17. The non-transitory machine-readable medium of claim 16, wherein the security manager is hosted by the management controller of the data processing system.

18. A data processing system, comprising:
    a processor; and
    a memory coupled to the processor to store instructions, which when executed by the processor, cause the processor to perform operations for managing operation of a data processing system, the operations comprising:
        obtaining, from hardware resources of the data processing system, user access data;
        providing, by a management controller of the data processing system and via an out-of-band communication channel that connects the management controller to a network module, the user access data to a security manager, the network module being connected to the hardware resources via an in-band communication channel that is separate from the out-of-band communication channel;
        transmitting, from the management controller to a power source via a sideband communication channel that is separate from the out-of-band communication channel and the in-band communication channel, an instruction that controls the power source to supply power to the hardware resources in a first power domain via a first power rail and supply power to the management controller in a second power domain via a second power rail, the first power domain being different from the second power domain;
        obtaining, by the management controller, a response from the security manager based on the user access data;
        in a first instance of the obtaining where the response indicates that the data processing system is exhibiting a level of data vulnerability that meets criteria:
            obtaining, by the management controller, a security policy, the security policy comprising an action set for updating the operation of the data processing system; and
            performing, by the management controller, the action set to update an existing operating state of the data processing system to a new operating state of the data processing system to reduce the level of data vulnerability exhibited by the data processing system.

19. The data processing system of claim 18, wherein the user access data comprises at least one type of data selected from a list of types of data consisting of:
   data regarding reading of data from the data processing system;
   data regarding modification of data on the data processing system;
   data regarding copying of data from the data processing system; and
   data regarding moving of data on the data processing system.

20. The data processing system of claim 18, wherein the security manager is configured to use an inference model to generate predictions regarding the level of data vulnerability of the data processing system.

* * * * *